P. FORSTER.
ELECTROMAGNETIC FRICTION COUPLING.
APPLICATION FILED JUNE 5, 1913.
1,122,380.
Patented Dec. 29, 1914.
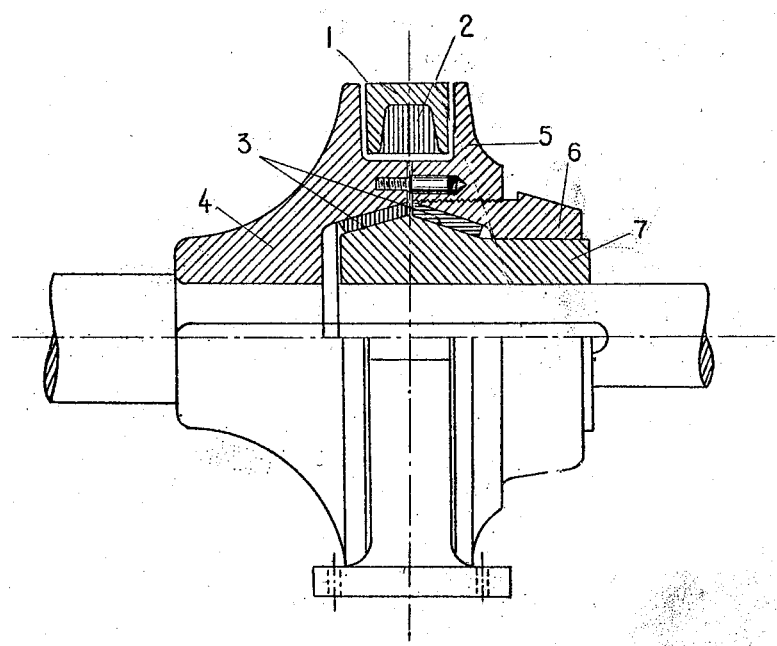

UNITED STATES PATENT OFFICE.

PAOLO FORSTER, OF TURIN, ITALY.

ELECTROMAGNETIC FRICTION-COUPLING.

1,122,380.  Specification of Letters Patent.  Patented Dec. 29, 1914.

Application filed June 5, 1913. Serial No. 771,954.

*To all whom it may concern:*

Be it known that I, PAOLO FORSTER, engineer, of Via San Quintino 47, Turin, Italy, have invented certain new and useful Improvements in Electromagnetic Friction-Couplings, of which the following is a full, clear, and exact specification.

This invention relates to electromagnetically operated friction devices by which the rotation of one shaft relative to a second shaft is permitted or precluded, of the type in which, on the production of the magnetic field, relative motion in a longitudinal direction, between two members rotated with one shaft, is produced, which members as a result are caused to come in contact with the frictional surfaces of a member rotatably mounted on a second shaft.

The object of the invention is to provide a device of the type referred to in which the friction members are so constructed that the tendency to slip is minimized.

According to the invention, the member mounted on the second shaft is formed of a plurality of frusta of cones, each frustum being so disposed that it tapers in the reverse direction to a corresponding frustum, and in which the frictional surfaces of the members rotated with the first mentioned shaft are correspondingly formed, in order to insure the maximum surface of contact with the friction surface of the member rotated with the second mentioned shaft.

In the accompanying drawing I have shown a preferred embodiment of the invention.

The magnet 1 and the coils 2 associated therewith are of such form that they may be rigidly secured to a bracket, joist or other support. On one shaft is keyed the sleeve 7 formed of non-magnetic material and provided with an enlarged portion 3 formed as the frusta of two cones, having adjacent bases. A member 4 is keyed to a second shaft. A second member 5, 6 is mounted on the sleeve 7 about which it is capable of rotation. When the member 4 is rotated the second member 5, 6 is also rotated due to studs or the like being provided on the member 4, said studs engaging registering depressions formed in the members 5, 6. The second half member 5 is preferably formed of two parts, one being capable of movement with respect to the other for the purpose of adjustment due to frictional wear. In the construction illustrated, the member 6 is provided with an external thread and the member 5 with a corresponding internal thread.

The devices provided on the member 4 for the purpose of insuring the rotation of the member 5, 6 must be formed so as to permit relative motion in a longitudinal direction between the two members.

The operation of the clutch is as follows: When current flows through the coils 2 a magnetic field is produced and the member 5, 6 is thus displaced in a longitudinal direction, approaching the member 4. In its movement, it comes in contact with the conical portion 3 of the sleeve 7 and moves this member in relation to the shaft on which it is mounted. By this further movement the other conical surface of the member 3 is brought into contact with the corresponding surface of the member 4. The enlarged portion 3 of the member 7 is thus securely gripped.

The above mentioned is a preferred embodiment of my invention, although I do not limit myself to the construction shown as the parts may be reversed with relation to the driving and driven shaft, without departing from the scope of my invention.

I claim:

An electromagnetically operated friction device comprising two shafts, said shafts adapted to rotate independently of each other, a non-magnetic member keyed to one of said shafts having its sides formed of a plurality of frusta of cones having adjacent bases, a two part magnetic member having its sections spaced from each other, one of said parts being keyed to the other of said shafts and having its inner surface adjacent to and of the contour of said first mentioned member, the second portion of said magnetic member seated on said non-magnetic member and having its inner surface adjacent and of the contour of said first mentioned member, means to prevent independent rotation of said spaced magnetic members, and a magnet positioned intermediate said magnetic members serving to force said magnetic and non-magnetic portions into frictional contact, substantially as described.

In witness whereof I have hereunto signed by name in the presence of two subscribing witnesses.

PAOLO FORSTER.

Witnesses:
C. L. FEYLES,
FELICE PAZETTA.